April 19, 1960 P. SCHÖDE 2,933,303
MEASURING DEVICE FOR APPROXIMATE DETERMINATION
OF ROLLING STOCK WHEEL PRESSURES
Filed Dec. 29, 1955
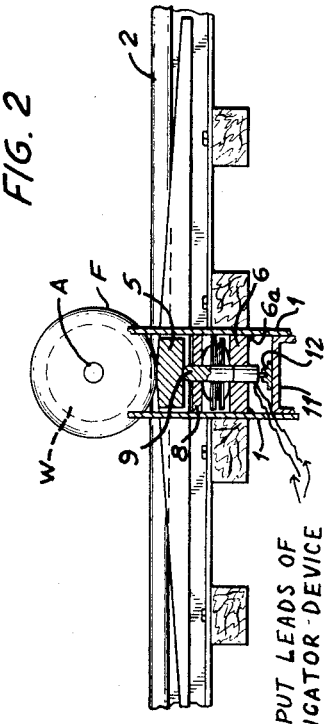
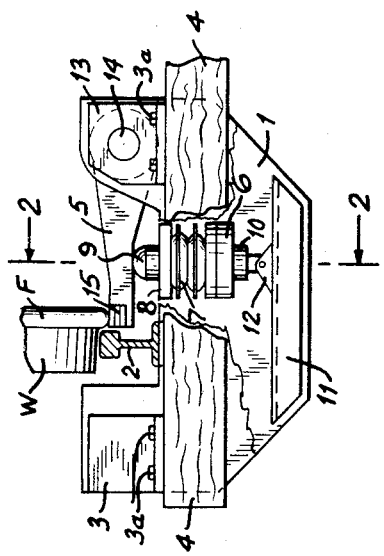
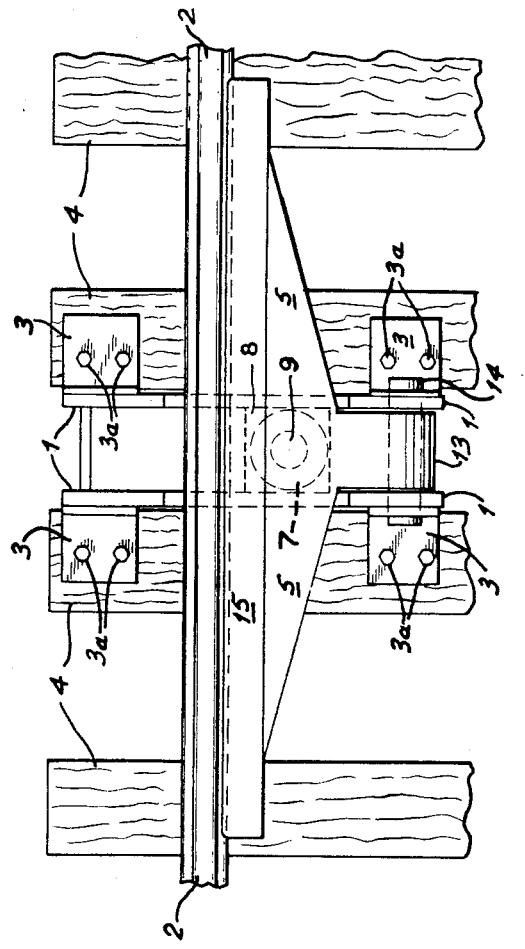
INVENTOR.
PAUL SCHODE
BY
*Albert Reiss*
Attorney

United States Patent Office 2,933,303
Patented Apr. 19, 1960

2,933,303
MEASURING DEVICE FOR APPROXIMATE DETERMINATION OF ROLLING STOCK WHEEL PRESSURES

Paul Schöde, Wuppertal-Barmen, Germany

Application December 29, 1955, Serial No. 556,298

Claims priority, application Germany January 3, 1955

3 Claims. (Cl. 265—49)

The weight measuring devices serving traffic in general call for a high degree of accuracy in weighing cars, because freight and delivery charges are in most instances based on weight. For this purpose, scales have been designed to particular standards, car lengths and weights.

However, for certain railroading purposes only the approximate weight of the cars need be known. To use car scales for weighing in such cases would be too expensive and in some instances impossible, as in the case of weighing fast moving cars, for example.

Measuring one car wheel is almost always sufficient in such cases and with this knowledge so-called wheel load meters in the form of spring or contact scales have been developed.

The use of rail sag to weigh cars is disclosed in German Patents 822,019 and 829,805. This method covers weights from 1.5 to 12 tons with a rail sag of 0.05 to 0.8 mm. The various registering factors in this case are to a high degree dependent on rail anchorage and roadbed. Furthermore, the vibrations in the rail caused by the passing cars vary in frequency depending on the speed and weight of the car and on the condition of the rail.

Spring scales designed as impact meters, torque pitch and spring pitch meters, with scale beams installed on the outside of the track, also came into use. This type of scale proved unsatisfactory and is therefore no longer used. The difficulty in operating these scales was due to the fact that the rim and not the flange of the wheel was used for registering purposes and, because of the relatively large freedom of motion of the cars on the track, the wheel rims could not always be counted on to make contact. In some of the designs the rail crown had to be altered. Furthermore, these designs required strong foundations next to the rail for leverage support. These scales used taper leaf and spiral springs, which had the great drawback of settling after a short period of operation and of changing the force travel pattern of the scale due to their change in length. They also required a compression and adjustment device intended to compensate for the change in length.

The invention refers to a spring scale in which a plate spring, placed in the scale clevis at right angles to the track, is compressed by a scale beam each time a car wheel passes over the beam ramp. With my improved scale, it is possible to measure spring excursions electrically within a 0-15 mm. range, so that wheel pressures of from 1.5 to 12 tons may be definitely registered with no gross errors, even with some interference from track dislocation or vibrations caused by the wheel. A passing wheel always activates the scale beam, because the wheel flange must make contact and in doing so controls the spring excursions. By using plate springs with a steep straight-line characteristic, excursions of 0–15 mm. can be registered directly on electric excursion meters without the use of rods or levers and can be used to control circuit arrangements. This system requires no special foundation to support the springs or scale beams. The clevises are simply attached directly to the railroad tie supporting the track.

To explain the principle of the invention an example of my improved measuring device will now be given with aid of the accompanying drawings, in which—

Fig. 1 is a side view partly in section of the measuring device,

Fig. 2 is a longitudinal section of the measuring device taken along the line AA—AA of Fig. 1, and Fig. 3 is a top plan view of the device installed on the track.

Referring now to Fig. 1, there is shown a support clevis made up of a pair of parallel disposed members 1 joined at the lower portion thereof by a U-shaped element 11. Attached to the outer side of the members 1 adjacent the top edges thereof are a pair of angle brackets 3. The lower portion of the angle brackets rest upon railroad ties 4, are fastened thereto by suitable fastening devices 3a and support the clevis elements 1 thereby. The elements 1 and the element 11 define a chamber within which is situated a bushing 8 which is movable downwardly along the walls of said chamber. A spring guide bolt 9 is attached through the central portion of bushing 8. The bushing and bolt are urged in a normally upward direction by means of a plate spring 7 which has one end thereof abutting against block 6 and its other end abutting against the under-side of bushing 8. Block 6 is firmly attached to the sides of the clevis elements 1 at point 6a as is more clearly shown in Fig. 2. Block 6 has a central aperture 6b extending between its upper and lower surfaces and the bolt 9 is adapted to movably fit therein. Pivotally mounted at point 14 between corresponding arms of clevis elements 1 may be found the scale beam 5 which beam rests up on the guide bolt 9 as shown in Fig. 1. The free end of the beam 5 is provided with a ramp surface which extends perpendicular to the length of the beam and which tapers from a relatively narrow dimension to a relatively thick dimension near the central portion thereof as is more clearly shown in Fig. 2. The narrowest portion of the ramp is adapted to be situated at a point with respect to rail 2 so that the flange F associated with the car wheels W may clear the lower portion of the said ramp. The deep portion of the ramp is designed so that the flange F may ride up the ramp and the full weight of the load carried by the wheel will thereby be imparted to the beam 5. Beneath the block 6 there are disposed a plurality of electrical registering devices 10, the purpose of which is to register and transmit the deflection path of scale beam 5 as the beam is depressed by the passing car wheels. The registering devices are no part of this invention and therefore no further description is made thereof. The thrust of the spring 7 must be sufficient to raise the wheel W via its flange F, such springs having a steep straight line characteristic.

While the principles of the invention have been described above in connection with specific embodiments and particular modifications thereof, it is to be clearly understood that this description is made only by way of example and not as a limitation on the scope of the invention as set forth in the objects thereof and in the accompanying claims.

What is claimed is:

1. A weight measuring device for weighing a railway car in motion along a pair of rails comprising a pair of spaced parallelly disposed clevis elements underlying and normal to the rails, means for fixedly supporting said elements with respect to the roadbed, a single scale beam lever having two ends, a first end pivotally supported between said clevis elements, the other end of said lever having a ramp surface extending adjacent to and parallel with the inside of one of said rails, said ramp surface adapted to cooperate with the flange portion of a car wheel and adapted to bear the weight of said wheel when the highest portion of said ramp is traversed by said flange, spring means abutting against said beam lever intermediate the ends thereof, and tending to normally urge said lever in an upward direction, said ramp being so configured and positioned that a passing car wheel will ride up the ramp to the highest portion thereof, and said spring being of sufficient strength to support the weight of a car wheel on the ramp above the level of said rail, and registering means for measuring the degree of depression of said spring means upon the passage of a car wheel over said ramp.

2. A weight measuring device as claimed in claim 1, wherein said spring means comprises a fixed bushing and a guide bolt slidably mounted therein.

3. A weight measuring device as claimed in claim 2, wherein said spring means comprises a plate spring having one end coupled to said bolt and the other end fixed with respect thereto.

References Cited in the file of this patent

UNITED STATES PATENTS

| | | |
|---|---|---|
| 756,208 | Bugler | Apr. 5, 1904 |
| 941,208 | Sturgis | Nov. 23, 1909 |
| 1,296,346 | Warring | Mar. 4, 1919 |
| 1,917,080 | Aihara | July 4, 1933 |
| 2,582,886 | Ruge | Jan. 15, 1952 |

FOREIGN PATENTS

| | | |
|---|---|---|
| 6,578 | Great Britain | Dec. 3, 1903 |
| 365,998 | Germany | Dec. 27, 1922 |
| 57,351 | Norway | Dec. 14, 1936 |